US010760674B2

(12) United States Patent
Ono et al.

(10) Patent No.: US 10,760,674 B2
(45) Date of Patent: Sep. 1, 2020

(54) POWER TRANSMISSION APPARATUS

(71) Applicant: Honda Motor Co., Ltd., Tokyo (JP)

(72) Inventors: Koji Ono, Wako (JP); Akira Kito, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 3 days.

(21) Appl. No.: 16/264,453

(22) Filed: Jan. 31, 2019

(65) Prior Publication Data

US 2019/0249764 A1 Aug. 15, 2019

(30) Foreign Application Priority Data

Feb. 13, 2018 (JP) .................................. 2018-023153

(51) Int. Cl.

| *F16H 57/04* | (2010.01) |
| *F16H 1/28* | (2006.01) |
| *F16H 37/08* | (2006.01) |
| *F16H 48/08* | (2006.01) |
| *B60K 1/00* | (2006.01) |
| *B60K 7/00* | (2006.01) |
| *F16H 57/02* | (2012.01) |

(52) U.S. Cl.
CPC .......... *F16H 57/0423* (2013.01); *F16H 1/28* (2013.01); *F16H 37/0813* (2013.01); *F16H 48/08* (2013.01); *F16H 57/0457* (2013.01); *F16H 57/0483* (2013.01); *F16H 57/0486* (2013.01)

(58) Field of Classification Search
CPC ............. F16H 57/0423; F16H 57/0457; F16H 57/0483; F16H 1/28; F16H 37/0813; F16H 48/08; F16H 57/0486
See application file for complete search history.

(56) References Cited

U.S. PATENT DOCUMENTS

| 3,771,622 | A | * | 11/1973 | Hyakumura | ........ F16H 57/0457 184/11.2 |
| 4,242,923 | A | * | 1/1981 | Nishikawa | ............. B60K 17/08 184/6.12 |
| 5,259,194 | A | * | 11/1993 | Okada | ..................... B60K 17/14 475/83 |
| 7,059,443 | B2 | * | 6/2006 | Kira | ......................... B60K 6/26 180/243 |
| 7,578,761 | B2 | * | 8/2009 | Nishikawa | ............. B60K 6/387 475/127 |
| 7,884,511 | B2 | * | 2/2011 | Mogi | ..................... B60K 17/12 310/54 |
| 8,302,506 | B2 | * | 11/2012 | Iwata | .................. F16H 57/0447 57/447 |
| 8,899,381 | B2 | * | 12/2014 | Ebihara | ................ B60K 7/0007 184/6.12 |

(Continued)

FOREIGN PATENT DOCUMENTS

| JP | 2008019886 A | 1/2008 |
| JP | 2012202552 A | 10/2012 |
| JP | 2017219072 A | 12/2017 |

*Primary Examiner* — Tinh Dang
(74) *Attorney, Agent, or Firm* — Duft & Bornsen, PC

(57) ABSTRACT

A power transmission apparatus including: a case having a first oil storage configured to store oil at a bottom thereof; a rotating body rotatably housed in the case and having a second oil storage configured as an approximately cylindrical rotating body for transmitting power and configured to store oil therein; and an introducing portion configured to introduce oil from the first oil storage into the second oil storage.

7 Claims, 5 Drawing Sheets

(56) References Cited

U.S. PATENT DOCUMENTS

| | | |
|---|---|---|
| 9,752,673 B2* | 9/2017 | Koga .................. F16H 57/0421 |
| 9,885,412 B2* | 2/2018 | Matsubara .............. F16H 57/04 |
| 9,920,828 B2* | 3/2018 | Fast .................... F16H 57/0412 |
| 10,281,021 B2* | 5/2019 | Ohmura .................. B60K 1/00 |
| 10,378,641 B2* | 8/2019 | Nakano .............. F16H 37/0813 |
| 10,539,225 B2* | 1/2020 | Nakano .............. F16H 57/0476 |
| 2015/0148174 A1* | 5/2015 | Nakamura ............... B60K 1/00 475/149 |
| 2018/0245663 A1* | 8/2018 | Yoshikawa ....... F16F 15/13469 |
| 2018/0283244 A1* | 10/2018 | Fujinuma ............... F01M 11/03 |
| 2019/0195313 A1* | 6/2019 | Yoshikawa .......... F16F 15/1478 |
| 2019/0203824 A1* | 7/2019 | Niwata ................. F16H 57/021 |
| 2019/0249764 A1* | 8/2019 | Ono ....................... F16H 57/04 |
| 2019/0249765 A1* | 8/2019 | Ito ....................... F16H 57/0457 |

\* cited by examiner

US 10,760,674 B2

POWER TRANSMISSION APPARATUS

CROSS-REFERENCE TO RELATED APPLICATION

This application is based upon and claims the benefit of priority from Japanese Patent Application No. 2018-023153 filed on Feb. 13, 2018, the content of which is incorporated herein by reference.

BACKGROUND OF THE INVENTION

Field of the Invention

This invention relates to a power transmission apparatus for transmitting torque by a rotating body rotating in a case.

Description of the Related Art

There have been known apparatuses that perform lubrication using oil scooped up by gears. Such an apparatus is described in, for example, Japanese Unexamined Patent Application Publication No. 2012-202552 (JP2012-202552A). The apparatus described in JP2012-202552A has a storage unit for storing lubricating oil in a case, a gear-housing unit for housing gears, and a partitioning unit for partitioning the storage unit and the gear-housing unit. In this apparatus, since oil level in the gear-housing unit is lowered as oil scooped up by the gears is stored in the storage unit, stirring resistance of oil by the gears is reduced.

However, in the case of the apparatus of JP2012-202552A, the gear-housing unit and the storage unit are partitioned by the partition inside the case, making the size of the apparatus larger.

SUMMARY OF THE INVENTION

An aspect of the present invention is a power transmission apparatus including: a case having a first oil storage configured to store oil at a bottom thereof; a rotating body rotatably housed in the case and having a second oil storage configured as an approximately cylindrical rotating body for transmitting power and configured to store oil therein; and an introducing portion configured to introduce oil from the first oil storage into the second oil storage.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described with reference to FIGS. 1 to 6. A power transmission apparatus 100 according to the embodiment of the present invention uses an electric motor 2 as a driving source of a vehicle and is mounted on motor-driven vehicles such as electric vehicles and hybrid vehicles.

Figure 1:
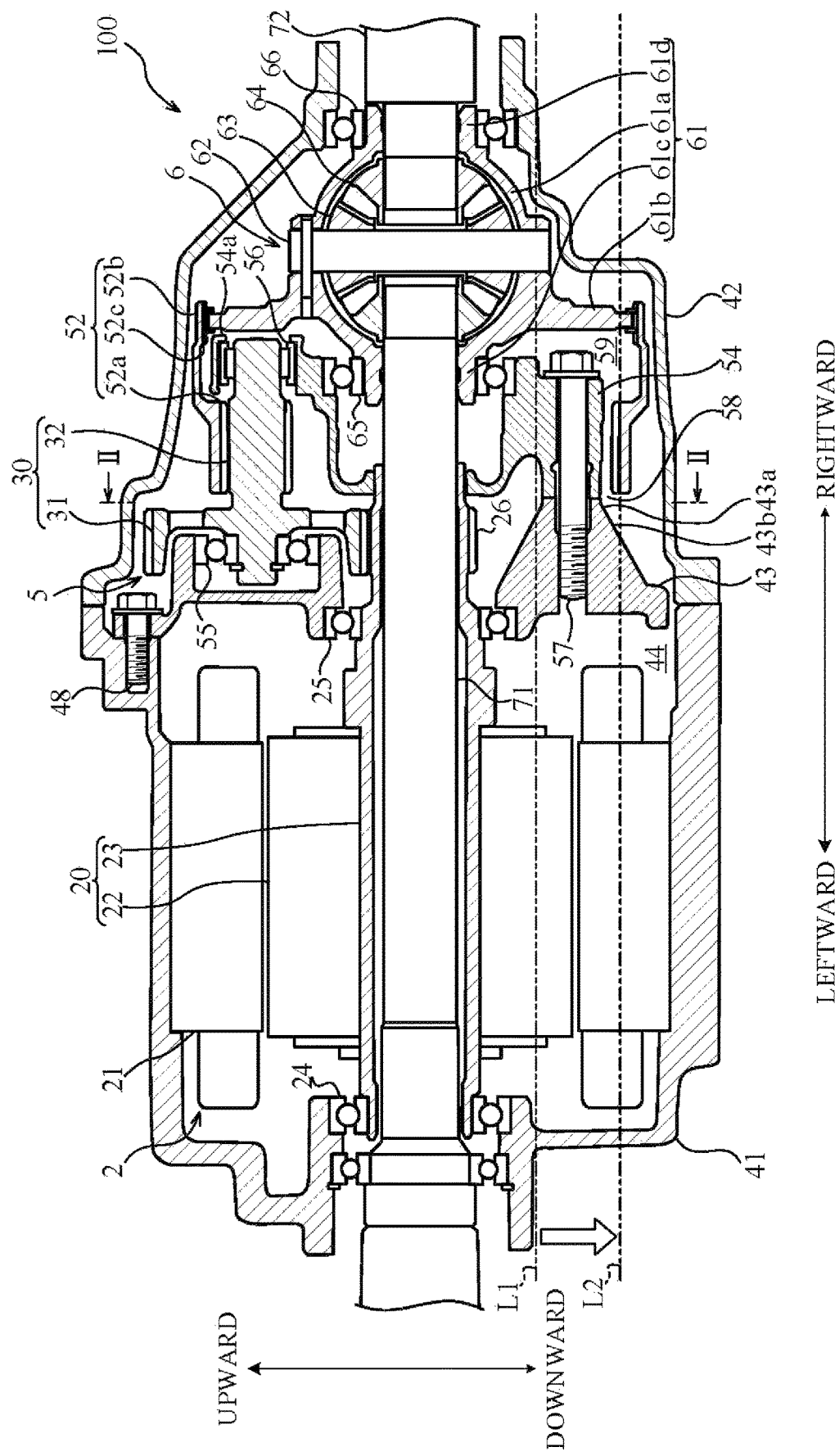
FIG. 1 is a sectional view showing a power transmission apparatus according to an embodiment of the present invention.
Figure 2:
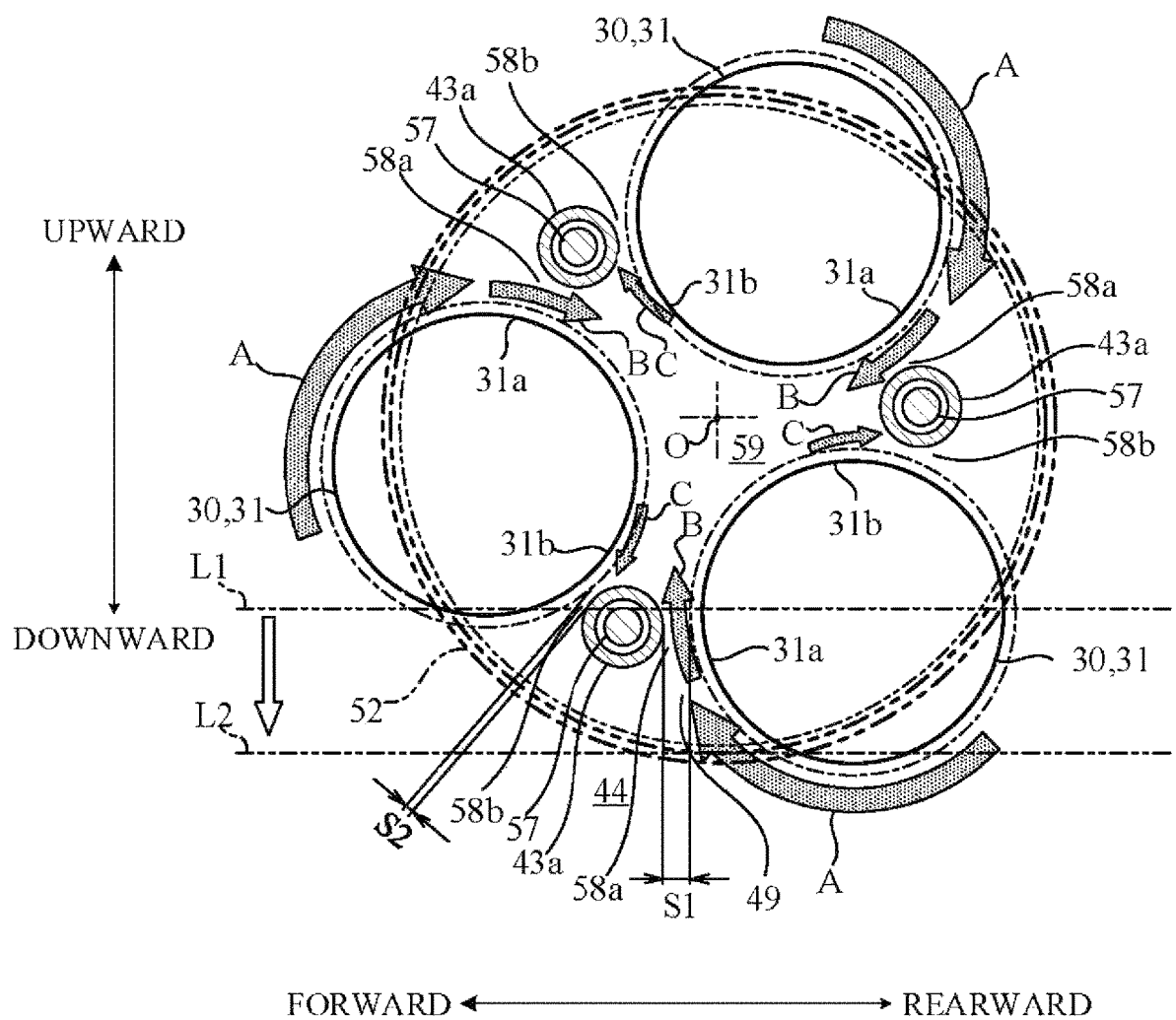
FIG. 2 is a sectional view along line II-II in FIG. 1.

FIG. 1 a sectional view showing the power transmission apparatus according to the embodiment of the present invention, and FIG. 2 is a sectional view along line II-II in FIG. 1. For convenience, the up-down direction, left-right direction, and front-rear direction are defined as shown in the drawings, and configurations of components will be described in accordance with these directions.

First, configuration of the power transmission apparatus 100 will be described. Cases 41, 42 of the power transmission apparatus 100 house the electric motor 2, a reduction gear train 5, and a differential mechanism 6. The power of the electric motor 2 is reduced in speed and transmitted to the differential mechanism 6 by the reduction gear train 5 and then distributed to left and right output shafts 71, 72 (axles) by the differential mechanism 6.

The electric motor 2 includes a stator 21, a rotor 22, and a rotor shaft 23. The rotor shaft 23 is rotatably supported by the case 41 and holders 43 through bearings 24, 25.

The reduction gear train 5 includes a rotor gear 26, a plurality of (three) counter gears 30, and a ring gear 52. The rotor gear 26 is formed on an axial end of the rotor shaft 23 and rotationally driven by the electric motor 2. The rotor 22 and the rotor shaft 23 form a rotor assembly 20. Each counter gear 30 includes a large-diameter gear 31 engaged with the rotor gear 26 and a small-diameter gear 32 engaged with the ring gear 52.

The ring gear 52 is coupled to a differential case 61 of the differential mechanism 6. The rotation of the rotor gear 26 is reduced in speed and transmitted to the differential case 61 by the counter gears 30 and ring gear 52. The disposition of the plurality of counter gears 30 can make the outer diameter of the reduction gear train 5 equivalent to the outer diameter of the electric motor 2. In other words, the heights in the up-down direction of the electric motor 2 and reduction gear train 5 can be made uniform in the left-right direction, resulting in efficient utilization of the spaces in the cases 41, 42.

The differential mechanism 6 includes the differential case 61, a shaft 62, a pair of pinion gears 63, and left and right side gears 64. The differential case 61 and shaft 62 rotate with the ring gear 52. When the pair of pinion gears 63 supported by the shaft 62 revolve, the left and right side gears 64 engaged with the pinion gears 63 rotate. Thus, the power transmitted to the differential case 61 is distributed to the left and right output shafts 71, 72 coupled to the left and right side gears 64. The left output shaft 71 is disposed so as to pass through the hollow rotor shaft 23.

The differential case 61 includes a hollow housing 61a, a flange 61b extending from the outer circumference of the housing 61a in a disc shape, and left and right journals 61c, 61d extending cylindrically from both ends of the housing 61a.

The housing 61a houses the pinion gears 63 and the side gears 64. The housing 61a has openings (not shown) for introducing oil (liquid medium). A coupling part 52b of the ring gear 52 is coupled to the outer circumferential end of the flange 61b, for example, by spline coupling. The journal 61c is rotatably supported by a holder 54 through a bearing 65. The journal 61d is rotatably supported by the case 42 through a bearing 66.

The holders 43, 54 rotatably support both ends of each counter gear 30 through bearings 55, 56. The holders 43 are fastened to the case 41 through bolts 48. The holders 43, 54 are fastened to each other through (three) bolts 57. The internal space of the cases 41, 42 is partitioned into a space containing the electric motor 2 and a space containing the reduction gear train 5 and differential mechanism 6 by the holders 43.

The bottoms of the cases 41, 42 form a case storage 44, which is an internal space of the cases 41, 42. The case storage 44 stores the oil. During rotation of the power transmission apparatus 100, the oil stored in the case storage 44 is scooped up by the counter gears 30, rotor 22, ring gear 52, and the like, and the components in the cases 41, 42 are lubricated by the scooped-up oil. That is, the components in the power transmission apparatus 100 are lubricated by so-called natural lubrication without using a pump.

The ring gear 52 forms a rotating-body storage 59, which is an internal space of the ring gear 52. The rotating-body storage 59 stores the oil. As will be described later, during rotation of the power transmission apparatus 100, the oil stored in the case storage 44 is scooped up by the counter gears 30 and the like, and the scooped-up oil is introduced into the rotating-body storage 59.

The ring gear 52 and differential case 61 comprise a rotating body that forms the rotating-body storage 59. The outer circumference of the rotating-body storage 59 is formed by the ring gear 52. The electric motor 2 side of the rotating-body storage 59 (left side in FIG. 1) is partitioned by the axial end of the rotor shaft 23, counter gears 30, holders 43, and the like, and the differential mechanism 6 side of the rotating-body storage 59 (right side in FIG. 1) is partitioned by the differential case 61 and the like.

The ring gear 52 includes inner circumferential teeth 52a engaged with the small-diameter gears 32, an annular recess 52c, and a cylindrical coupling part 52b coupled to the differential case 61. Supports 54a of the holder 54 that support the bearings 56 of the counter gears 30 are disposed inside the ring gear 52. The annular recess 52c is formed so as to surround the three supports 54a. An annular space formed by the annular recess 52c forms a part of the rotating-body storage 59.

The holder 54, small-diameter gears 32, bearings 56, bearing 65, and the like are disposed in the rotating-body storage 59. The oil introduced into the rotating-body storage 59 lubricates the engagement portions between the inner circumferential teeth 52a of the ring gear 52 and the small-diameter gears 32, the bearings 56, and the bearing 65.

As shown in FIG. 2, the reduction gear train 5 of this embodiment includes the three counter gears 30. The three counter gears 30 are disposed circumferentially at equal intervals (120° intervals) around the rotation center of the rotor gear 26. For reference, the ring gear 52 is shown using phantom lines in FIG. 2. Parts of the counter gears 30 are formed to protrude in the outer diameter direction of the ring gear 52 and thus can effectively scoop up the oil in the case storage 44.

Introducing portions 58 that introduce the oil into the rotating-body storage 59 through three diaphragms 43a are disposed among the circumferentially adjacent large-diameter gears 31. The three diaphragms 43a are disposed among the circumferentially adjacent large-diameter gears 31. Each introducing portion 58 consists of a large clearance 58a and a small clearance 58b. The large clearance 58a is formed between a part 31a rotating from the outer circumference toward the center O of the ring gear 52, of the outer circumference of the rotating large-diameter gear 31 and the diaphragm 43a. The large clearance 58a forms a channel for the oil flowing into the rotating-body storage 59. The small clearance 58b is formed between a part 31b rotating from the center O toward the outer circumference of the ring gear 52, of the outer circumference of the rotating large-diameter gear 31 and the diaphragm 43a. The small clearance 58b forms a channel for the oil flowing out of the rotating-body storage 59.

The large clearance 58a is formed such that the opening width S1 thereof is larger than the opening width S2 of the small clearance 58b. For this reason, in the introducing portion 58, the amount of oil splashed by the large-diameter gear 31 and flowing into the rotating-body storage 59 as shown by arrows B in FIG. 2 is larger than the amount of oil splashed by the large-diameter gear 31 and flowing out of the rotating-body storage 59 as shown by an arrow C in FIG. 2. Accordingly, the introducing portion 58 consisting of the large clearance 58a and small clearance 58b as a whole introduces the oil into the rotating-body storage 59.

Each diaphragm 43a is a cylindrical part in which a bolt 57 of the holder 43 is inserted and has an approximately truncated-conical-surface-shaped slope portion 43b inclined to swell toward the rotating-body storage 59 (rightward in FIG. 1) on the outer circumferential surface thereof. The oil splashed around the diaphragm 43a is guided to the rotating-body storage 59 by the slope portion 43b.

Figure 3:
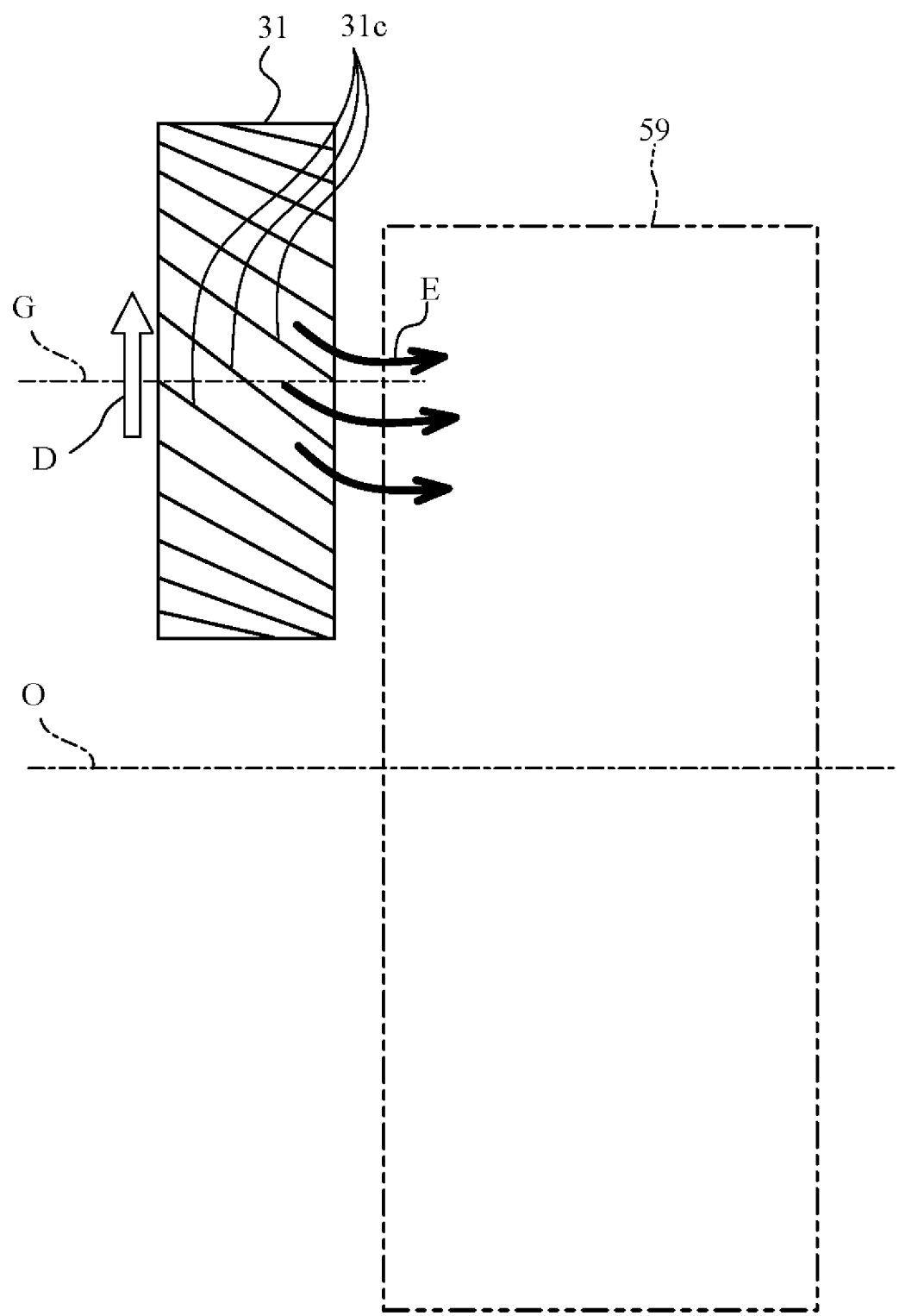
FIG. 3 is a diagram showing configuration of a large-diameter gear.

FIG. 3 is a drawing showing the configuration of a large-diameter gear 31. The large-diameter gear 31 is a helical gear having a helix angle at which each tooth is inclined with respect to the center G. The large-diameter gear 31 has slope portions 31c opposed to the rotating-body storage 59 on the tooth surfaces thereof. As the large-diameter gear 31 rotates around the center G in a direction shown by an arrow D in FIG. 3, the oil splashed by the slope portions 31c of the teeth is guided toward the rotating-body storage 59 (rightward in FIG. 3) as shown by arrows E in FIG. 3.

During a stop or extremely low speed travel of the vehicle, the oil level of the oil stored in the case storage 44 is located in a position L1 shown in FIG. 1 and FIG. 2, and the rotor 22, the large-diameter gears 31, and a part of the ring gear 52 are soaked in the stored oil. In this operation state, the part of the ring gear 52 is soaked in the oil in the case storage 44 and thus the oil in the case storage 44 is introduced into the rotating-body storage 59. When a large current flows through the electric motor 2, for example, when the vehicle starts, a part of the rotor 22 is soaked in the oil and thus the coolability of the rotor 22 is ensured.

During rotation of the power transmission apparatus 100, the large-diameter gears 31 scoop up the oil stored in the case storage 44 as shown by arrows A in FIG. 2, and part of the oil splashed around the large-diameter gears 31 is introduced into and stored in the rotating-body storage 59 through the introducing portions 58 as shown by the arrows B in FIG. 2.

During rotation by which the vehicle speed is increased to a certain level, a larger amount of oil is stored in the rotating-body storage 59 and thus the oil level in the case storage 44 is lowered to a position L2, as shown in FIG. 1 and FIG. 2. In this operation state, only parts of the large-diameter gears 31 protruding in the outward radial direction of the ring gear 52 are soaked in the oil stored in the case storage 44, and the rotor 22 and ring gear 52 rotate above the oil level position L2. Thus, the stirring resistance of the oil by the power transmission apparatus 100 is reduced.

Also, the components, such as the counter gears 30 and ring gear 52, in the rotating-body storage 59 are lubricated by the oil stored in the rotating-body storage 59.

Figure 4:
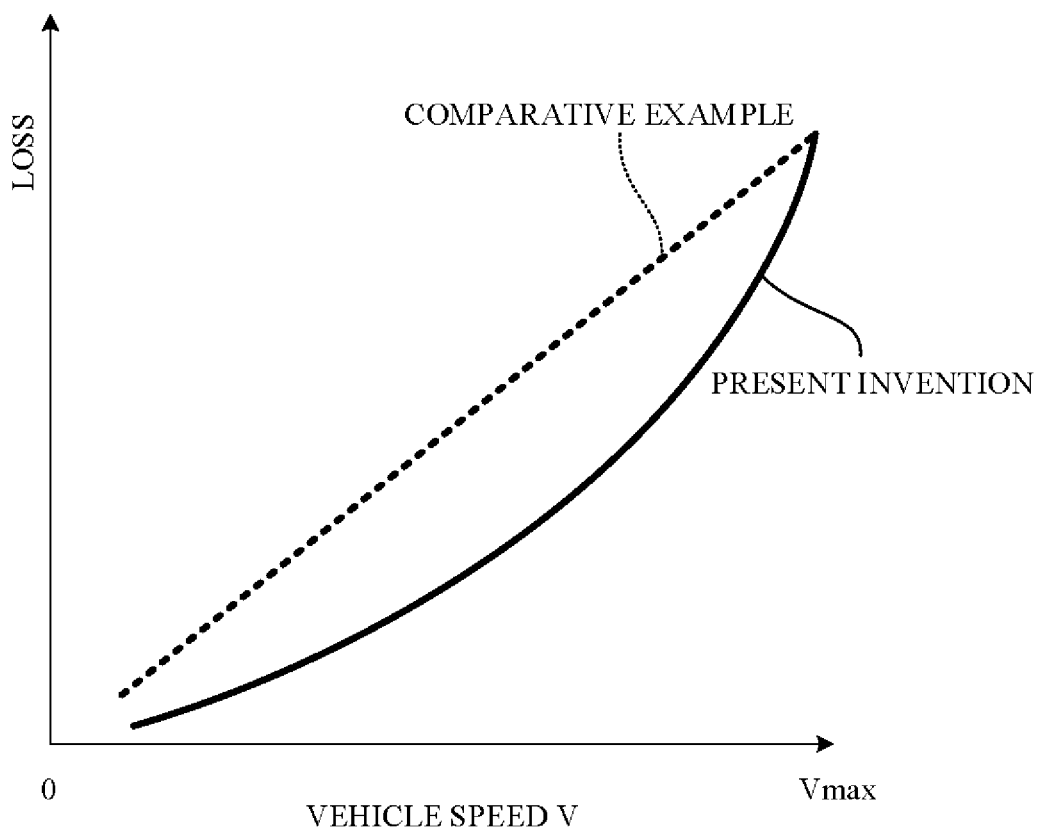
FIG. 4 is a graph showing a state in which loss of the power transmission apparatus changes in accordance with the vehicle speed.

FIG. 4 is a graph showing a state in which the loss of the power transmission apparatus changes in accordance with the vehicle speed. In FIG. 4, a solid line shows a state in which the loss of the power transmission apparatus 100 of the present embodiment changes in accordance with the vehicle speed, and a broken line shows a state of a power transmission apparatus of a comparative example whose case does not include a rotating-body storage.

In most of the low to high speed ranges, the oil level position in the cases 41, 42 of the power transmission apparatus 100 of the present embodiment is lower than that of the comparative example and thus the loss of the power transmission apparatus 100 is less than that of the comparative example. On the other hand, in the maximum speed range around the maximum speed Vmax (e.g., about 130 km/h), the loss of the power transmission apparatus 100 of the present embodiment is equivalent to that of the comparative example.

The reason is that the centrifugal force acting on the oil stored in the rotating-body storage 59 is increased and thus the amount of oil stored in the rotating-body storage 59 is reduced and the oil level position in the cases 41, 42 is raised. In this operation state, a part of the rotor 22 is soaked in the oil and thus the stirring resistance of the oil by the rotor 22 and the like is slightly increased, but the coolability of the electric motor 2 is ensured.

Figure 5:
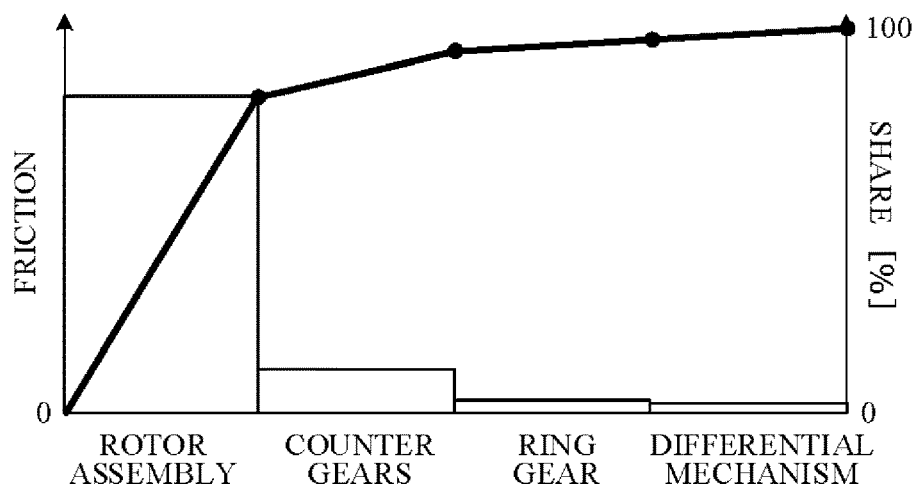
FIG. 5 is a graph showing shares in friction of the power transmission apparatus.

FIG. 5 is a graph showing the shares in the friction of the power transmission apparatus 100. More specifically, FIG. 5 shows the shares of the friction (stirring resistance) of the components in the friction of the entire power transmission apparatus 100. As shown in FIG. 5, in the friction of the power transmission apparatus 100, the share of the rotor assembly 20 (the rotor 22 and rotor shaft 23) is dominant (e.g., 80% or more) and is higher than those of the counter gears 30, ring gear 52, and differential mechanism 6.

Figure 6:
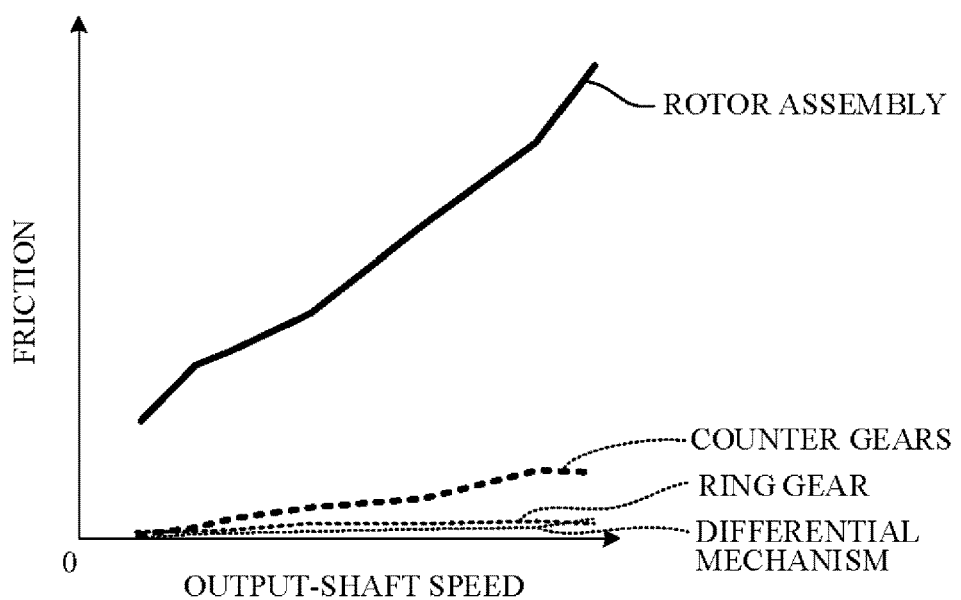
FIG. 6 is a graph showing a state in which the friction of the power transmission apparatus changes in accordance with an output-shaft speed.

FIG. 6 is a graph showing a state in which the friction of the power transmission apparatus 100 changes in accordance with the output-shaft speed. More specifically, FIG. 6 shows a state in which the friction of each component changes in accordance with the speed of the output shafts 71, 72. As shown in FIG. 6, even if the speed of the output shafts 71, 72 changes, the friction of the rotor assembly 20 is greater than that of the counter gears 30, ring gear 52, and ring gear 6.

As seen above, in the friction caused on the power transmission apparatus 100, the stirring resistance by the rotor assembly 20, whose rotation speed is relatively high, is dominant. Accordingly, the stirring resistance of the oil stored in the rotating-body storage 59 by the counter gears 30 or ring gear 52 has less influence on the friction of the power transmission apparatus 100.

The present embodiment can produce the following advantageous effects:

(1) The power transmission apparatus 100 of the present embodiment includes the cases 41, 42 that have, at the bottoms thereof, the case storage 44 storing the oil, the ring gear 52 that is an approximately cylindrical rotating body, is rotatably housed in the cases 41, 42, transmits power, and includes the rotating-body storage 59 storing the oil, and the introducing portions 58 that introduce the oil in the case storage 44 into the rotating-body storage 59. The ring gear 52 forms a hollow rotating body that rotates in the cases 41, 42 (FIG. 1 and FIG. 2). Thus, in the power transmission apparatus 100, the oil level in the case storage 44 is lowered as the oil is stored into the rotating-body storage 59, resulting in a reduction in the stirring resistance of the oil. Also, in the power transmission apparatus 100, the internal space of the ring gear 52 is used as the rotating-body storage 59 for storing the oil. Thus, the power transmission apparatus 100 is smaller in size than those whose cases 41, 42 house a storage (tank) different from the case storage 44.

(2) The power transmission apparatus 100 includes the small-diameter gears 32 engaged with the ring gear 52 and the large-diameter gears 31 that rotate with the small-diameter gears 32 coaxially. The introducing portions 58 introduce the oil splashed by the large-diameter gears 31 into the rotating-body storage 59 (FIG. 2).

Thus, the power transmission apparatus 100 does not have to include a pump to introduce the oil into the rotating-body storage 59, resulting in suppression of upsizing of the apparatus.

(3) Each large-diameter gear 31 has the slope portions 31c opposed to the rotating-body storage 59 (FIG. 3). Thus, when the large-diameter gears 31 rotate, the oil splashed by the large-diameter gears 31 is guided to the rotating-body storage 59 by the slope portions 31c.

(4) The large-diameter gears 31 are circumferentially adjacent to each other around the rotation axis of the ring gear 52 (FIG. 2). The power transmission apparatus 100 includes the diaphragms 43a that are disposed between the large-diameter gears 31 and have the cylindrical outer circumferential surfaces (FIG. 2). Each introducing portion 58 consists of the large clearance 58a between the outer circumferential surface of the diaphragm 43a and the outer circumferential surface of the large-diameter gear 31 and the small clearance 58b between the outer circumferential surface of the diaphragm 43a and the outer circumferential surface of the large-diameter gear 31 (FIG. 2).

Each diaphragm 43a is disposed such that the opening width S1 of the large clearance 58a is larger than the opening width S2 of the small clearance 58b, which are the minimum clearance between the outer circumferential surface of the diaphragm 43a and the outer circumferential surface of the large-diameter gear 31 (FIG. 2).

Thus, in each introducing portion 58, the amount of oil splashed by the large-diameter gear 31 and flowing into the rotating-body storage 59 is larger than the amount of oil splashed by the large-diameter gear 31 and flowing out of the rotating-body storage 59. This allows the oil splashed by the large-diameter gear 31 to be introduced and stored into the rotating-body storage 59.

(5) Each diaphragm 43a has, as the outer circumferential surface thereof, the approximately truncated-conical-surface-shaped slope portion 43b opposed to the rotating-body storage 59 (FIG. 1). Thus, when the large-diameter gear 31 rotates, the oil splashed by the large-diameter gear 31 is guided to the rotating-body storage 59 by the slope portion 43b.

(6) The power transmission apparatus 100 includes the electric motor 2 that is housed in the cases 41, 42 and transmits power to the ring gear 52 (FIG. 1). The power of the electric motor 2 is reduced and transmitted by the reduction gear train 5 including the ring gear 52. Thus, in the power transmission apparatus 100, the friction against which the electric motor 2 rotating at higher speed than the ring gear 52 stirs the oil is dominant. This makes less influential the friction against which the ring gear 52 stirs the oil in the rotating-body storage 59.

(7) In the power transmission apparatus 100, the differential case 61 housed in the cases 41, 42 and constituting the differential mechanism 6 constitutes the rotating body that forms the rotating-body storage 59 (FIG. 1). This allows the differential mechanism 6 to be lubricated by the oil stored in the rotating-body storage 59. Note that the differential mechanism 6 distributes the power to the output shafts 71, 72 such that differential rotation occurs between the output shafts 71, 72.

While, in the above embodiment, the introducing portions 58 primarily introduce the oil splashed by the large-diameter gears 31 to the rotating-body storage 59, the oil discharged from a pump may be introduced to the rotating-body storage 59 as a modification.

While the case storage 44 is formed by the bottoms of the cases 41, 42, it may be formed by a member different from the cases 41, 42 as a modification.

While the example in which the power transmission apparatus 100 is applied to an apparatus that drives a vehicle has been described, the present invention can also be applied to power transmission apparatuses used in entities different from a vehicle.

The above embodiment can be combined as desired with one or more of the above modifications. The modifications can also be combined with one another.

According to the present invention, since oil level in the case storage is lowered as oil is stored in the rotating-body storage, stirring resistance of oil can be reduced. And, since the internal space of the rotating body is used as the rotating-body storage for storing oil, the apparatus can be smaller in size.

Above, while the present invention has been described with reference to the preferred embodiments thereof, it will be understood, by those skilled in the art, that various changes and modifications may be made thereto without departing from the scope of the appended claims.

What is claimed is:

1. A power transmission apparatus comprising:
    a case having a first oil storage configured to store oil at a bottom thereof;
    a rotating body rotatably housed in the case and having a second oil storage configured as a cylindrical rotating body for transmitting power and configured to store oil therein; and
    an introducing portion configured to introduce oil from the first oil storage into the second oil storage, wherein
    the rotating body is a ring gear having inner circumferential teeth, wherein the power transmission apparatus further comprises:
        a plurality of small-diameter gears engaged with the ring gear; and
        a plurality of large-diameter gears rotating coaxially with the plurality of small-diameter gears, wherein
    the introducing portion introduces oil splashed by the plurality of large-diameter gears from the first oil storage into the second oil storage.

2. The power transmission apparatus according to claim 1, wherein
    each of the plurality of large-diameter gears has a slope portion opposed to the second oil storage.

3. The power transmission apparatus according to claim 1, wherein
    the plurality of large-diameter gears includes a first large-diameter gear and a second large-diameter gear circumferentially adjacent to each other around a rotation axis of the ring gear, wherein the power transmission apparatus further comprises:
    a diaphragm having an outer circumferential surface of a cylindrical shape and disposed between the first large-diameter gear and the second large-diameter gear, wherein
    the introducing portion is formed as a clearance between the outer circumferential surface of the diaphragm and an outer circumferential surface of the first large-diameter gear and a clearance between the outer circumferential surface of the diaphragm and an outer circumferential surface of the second large-diameter gear.

4. The power transmission apparatus according to claim 3, wherein
    the diaphragm is disposed so that a minimum width of the clearance between the outer circumferential surface of the diaphragm and the outer circumferential surface of the first large-diameter gear is larger than a minimum width of the clearance between the outer circumferential surface of the diaphragm and the outer circumferential surface of the second large-diameter gear.

5. The power transmission apparatus according to claim 3, wherein
    the diaphragm has a slope portion in a truncated-conical-surface-shape opposed to the second oil storage on the outer circumferential surface thereof.

6. The power transmission apparatus according to claim 1, further comprising:
    an electric motor housed in the case and configured to transmit power to the rotating body.

7. The power transmission apparatus according to claim 1, further comprising:
    a differential case housed in the case and constitutes a differential mechanism, wherein the rotating body is the differential case.

* * * * *